(12) United States Patent
Smith, Jr.

(10) Patent No.: US 6,243,390 B1
(45) Date of Patent: Jun. 5, 2001

(54) ISDN COMMUNICATIONS CONTROLLER

(75) Inventor: Robert Lynn Smith, Jr., Cary, NC (US)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 08/820,332

(22) Filed: Mar. 12, 1997

Related U.S. Application Data (60) Provisional application No. 60/013,174, filed on Mar. 12, 1996.

(51) Int. Cl.[7] .................................................. H04L 12/54
(52) U.S. Cl. ............................................ 370/437; 370/524
(58) Field of Search .................................. 370/410, 522, 370/524, 420, 421, 433, 434, 437, 465

(56) References Cited

U.S. PATENT DOCUMENTS

| | | | |
|---|---|---|---|
| 4,445,213 | 4/1984 | Baugh et al. | 370/94 |
| 4,821,264 | 4/1989 | Kim | 370/110.1 |
| 4,932,022 | * 6/1990 | Keeney et al. | 370/354 |
| 4,970,723 | 11/1990 | Lin | 370/110.1 |
| 5,062,103 | 10/1991 | Davidson et al. | 370/58.1 |
| 5,127,003 | 6/1992 | Doll, Jr. et al. | 370/110.1 |
| 5,185,765 | 2/1993 | Walker | 375/22 |
| 5,305,312 | 4/1994 | Fornek et al. | 370/62 |
| 5,341,377 | * 8/1994 | Ohtani | 370/524 |
| 5,371,534 | * 12/1994 | Dagdeviren et al. | 370/524 |
| 5,373,316 | 12/1994 | Ishinabe et al. | 348/15 |
| 5,398,249 | 3/1995 | Chen et al. | 370/105.1 |
| 5,416,781 | 5/1995 | Ruiz | 370/110.1 |
| 5,420,867 | * 5/1995 | Price et al. | 370/524 |
| 5,457,692 | 10/1995 | Ishinabe et al. | 370/110.1 |
| 5,574,861 | * 11/1996 | Lorvig et al. | 370/410 |
| 5,579,370 | * 11/1996 | Fukushima et al. | 455/440 |
| 5,600,655 | 2/1997 | Ishinabe et al. | 370/524 |
| 5,613,164 | 3/1997 | DiAngelo et al. | 395/884 |
| 5,629,931 | 5/1997 | Kausel | 370/241 |

FOREIGN PATENT DOCUMENTS

| | | |
|---|---|---|
| 95/21498 | 8/1995 | (WO). |
| 95/22218 | 8/1995 | (WO). |

* cited by examiner

*Primary Examiner*—Ajit Patel
(74) *Attorney, Agent, or Firm*—Foley & Lardner

(57) ABSTRACT

A communications controller for interfacing multiple analog telephone terminals to an integrated services digital network (ISDN) line connected to a telecommunications network, the ISDN line having two bearer (B) channels and a data (D) channel. The controller comprises an ISDN interface providing a physical bi-directional interface to the two B-channels and the D-channel of the ISDN line. A base logic processor, and D-channel protocols process supports a Q.931 protocol with a central office of the telecommunications network and an X.25-based protocol with a remote device, via the ISDN interface and D-channel over which command and response packets to and from the base logic processor with the central office or the remote device are transmitted. Multiple analog interfaces are adapted to support respective telephone terminals for passing bi-directional analog voice signals. Selectable coders/decoders (CODECs), connected to respective analog interfaces, encode the analog voice signals to digital pulse code modulation (PCM) or adaptive differential PCM (ADPCM) and decode PCM or ADPCM to analog, as selected by the base logic processor. A bandwidth controller connects, via the ISDN interface, the encoded voice signals to or from the selectable CODECs with communication subchannels allocated among bandwidth of the B-channels, as directed by the base logic processor, forwarding precisely timed bandwidth availability. The communications controller supports up to five telephone connections concurrently through the telecommunications network.

18 Claims, 3 Drawing Sheets

ISDN COMMUNICATIONS CONTROLLER

This application is based on provisional application Ser. No. 60/013,174 filed Mar. 12, 1996.

BACKGROUND OF THE INVENTION

This invention relates generally to digital communications systems and, in particular, to a system having a communications controller providing access to an integrated service digital network (ISDN).

Devices for interfacing multiple analog telephones to an ISDN line of a telecommunications network are known. For example, International PCT application WO 95/22218 published on Aug. 17, 1995 and U.S. Pat. No. 5,305,312 issued on Apr. 19, 1994 disclose such devices. However, these known devices only support a maximum of two telephones in concurrent use.

It is desirable to support more concurrently active telephones over the single ISDN line.

SUMMARY OF THE INVENTION

It is an object of the present invention to provide a new and improved ISDN communications controller.

The invention, therefore, according to a first aspect provides in a system having a plurality of devices coupled to a first communications controller which is connected to an integrated services digital network (ISDN) line of a telecommunications network through which a call connection is established with a second communications controller, the ISDN line having two bearer channels of predetermined bandwidth and a data channel, a method of interfacing the devices to the ISDN line for concurrent communications over the call connection with the second controller comprising the steps of: negotiating, on the data channel, between the first and second communications controllers appropriation of one or more subchannels from the bandwidth of the two bearer channels; and allocating the one or more subchannels to respective devices of the plurality of devices.

In accordance with a second aspect, the invention provides An apparatus for interfacing a plurality of analog telephone terminals to an integrated services digital network (ISDN) line connected to a telecommunications network, the ISDN line having two bearer (B) channels and a data (D) channel, the apparatus comprising: base logic; an ISDN interface providing a physical bi-directional interface to the two B-channels and the D-channel of the ISDN line; D-channel protocol means supporting communications with a central office of the telecommunications network and with a remote device, via the ISDN interface and D-channel over which command and response packets to and from the base logic with the central office or the remote device are transmitted; a plurality of analog interfaces adapted to support respective telephone terminals for passing bi-directional analog voice signals; a plurality of selectable coders/decoders (CODECs), connected to respective analog interfaces, for encoding the analog voice signals to digital pulse code modulation (PCM) or adaptive differential PCM (ADPCM) and decode PCM or ADPCM to analog, as selected by the base logic; and bandwidth control adapted to connect, via the ISDN interface, the encoded voice signals to or from the selectable CODECs with communication subchannels allocated among bandwidth of the B-channels, as directed by the base logic, synchronized to the bit level between controllers.

A home access network controller, manifesting the present invention, is a device that may interface subscriber premises telephone equipment with a public switched telephone network, through an ISDN interface. It is intended for residential or small office application, where it provides certain efficiencies and conveniences not previously available in that setting. A primary advantage is the capacity to support more than two and up to five telephones in concurrent use.

BRIEF DESCRIPTION OF THE DRAWINGS

The invention will be better understood from the following description of a home access network controller (HANC) system together with reference to the accompanying drawings, in which.

DETAILED DESCRIPTION

Figure 1:
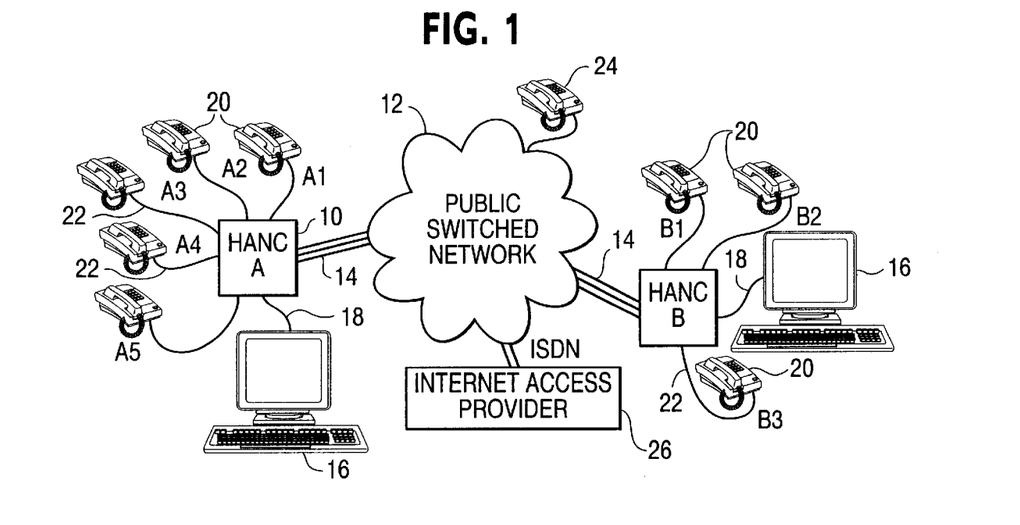
FIG. 1 is a schematic representing a first application of the HANC system.

Referring to FIG. 1, for illustration of the present invention an application of the home access network controller (HANC) system is diagrammed. Two HANC 10 communication controller devices are shown, labeled A and B respectively, which typically would be installed in separate subscriber residences and interconnected through a backbone network that provides many readily connectable full-duplex channels of communications, namely a public switched telephone network (PSTN) 12. Each HANC 10 connects to the PSTN 12 via its own ISDN Basic Rate Interface (BRI) line 14, consisting of two 64 Kbps bearer (B) channels and one 16 Kbps data (D) channel multiplexed together on the same twisted pair. Coupled to the HANC 10 at each subscriber residence are subordinate devices, such as, one or more personal computers (PC) 16 connected via an Ethernet local area network (LAN) 18, and up to five plain ordinary telephony service (POTS) telephones 20 connected in a star configuration via analog lines 22 which support dual tone multi-frequency (DTMF) and switch-hook signaling with analog voice. Additional terminal device types (not shown) may be supported.

The HANC 10 represents the subscriber telephone equipment to the PSTN 12 and functions as both a router and a dynamic bandwidth controller. It accepts calls announced on the BRI D-channel and routes them to the PC 16 or the appropriate telephone 20, each of which may be identified externally at the PSTN 12 by a unique directory number (DN). Conversely it delivers calls originating among its local subordinate devices, for example, from a particular telephone 20 to a remote telephone 24 or from the PC 16 to an Internet Access Provider 26. The HANC 10 converts signals to and from the lines 14, 22 between analog voice and either 64 Kbps pulse code modulation (PCM) or 24 Kbps modified adaptive differential PCM (ADPCM) which supports an eight-to-three bit compression, depending on whether the remote device to which it is connected through the PSTN 12 is another HANC. It also acts as a network gateway for PC protocols, encapsulating LAN packets for transmission on the ISDN B-channels.

Figure 2:
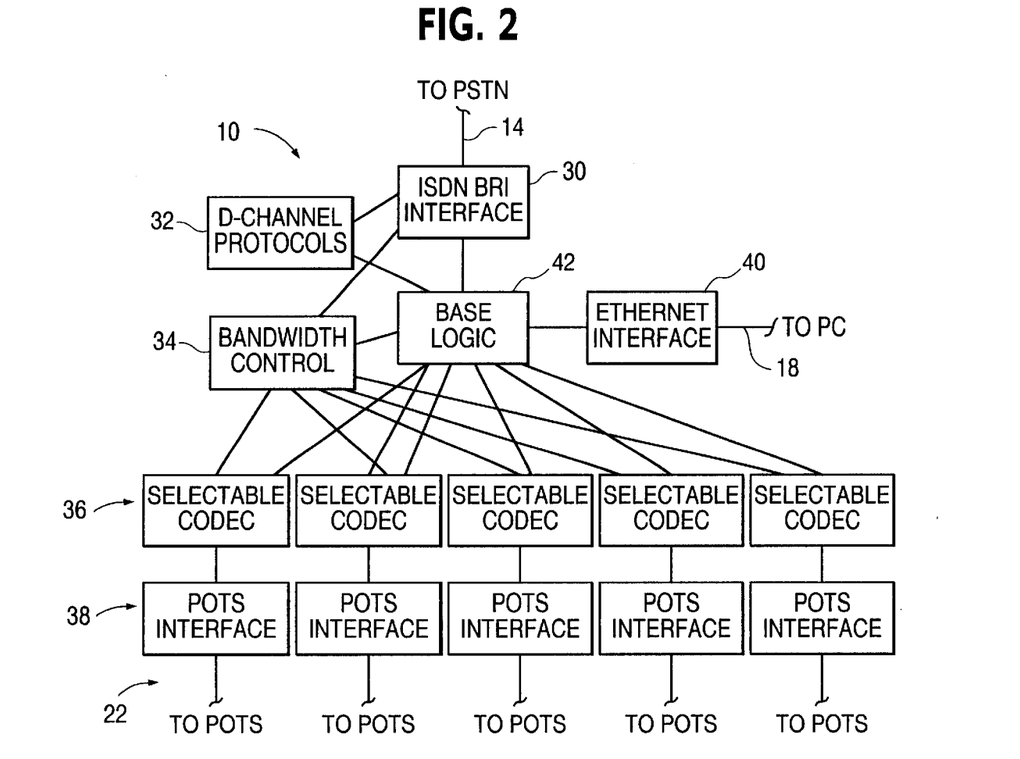
FIG. 2 is a block diagram depicting functional elements of the HANC.

Referring to FIG. 2, the HANC 10 is characterized by various functional elements which comprise an ISDN BRI interface 30, D-channels protocols 32, bandwidth control 34, selectable coders/decoders (CODECs) 36, POTS interfaces 38, Ethernet interface 40 and base logic 42.

The ISDN BRI interface 30 provides the physical bi-directional interface to the ISDN line 14 of the PSTN, and separates or combines the D-channel and two B-channels while deriving the line clock. It informs the base logic 42 of line status.

The D-channel protocols 32 supports the physical and link layers for the Q.931 protocol with a central office of the PSTN and an X.25-based protocol with a remote HANC. Command and response packets are passed to and from the base logic 42.

The bandwidth control 34 connects digital voice to or from the CODECs 36 with subchannels assigned among the 128 Kbps total bandwidth of the B-channels combined, as directed by the base logic 42. In other words, each B-channel supports a 64 Kbps transmission rate in the form of 8,000 8-bit octets per second, and the bandwidth control 34 utilizes the combined bandwidth of 128 Kbps to multiplex the digital voice by time division thereby creating communication subchannels in the B-channel bandwidth. Data derived from or destined to an attached PC can also be directed to or from such a subchannel.

The selectable CODECs 36 encode analog voice signals to digital PCM or ADPCM and decode PCM or ADPCM to analog, as selected by the base logic 42. A CODEC 36 segregates the transmitted and received analog signals. It is the actual source (on its digital side) of the various signaling tones said to be issued on the POTS interface 38 below. There is one CODEC 36, logically at least, for each subordinate telephone.

The POTS interface 38 supports the subordinate analog telephones, one each, providing the physical interface including DC current. It detects switch-hook transfer and DTMF tones, reporting both to the base logic 42. As directed by the base logic 42, it issues dial tone, busy tone, remote ringing tone and local ringing AC and passes the bi-directional voice signal.

The Ethernet interface 40 connects the residential personal computer via IEEE 802.3 physical and link protocols, providing packetized data to and from the base logic 42 at the rate of 10 Mbps.

The base logic 42 is the processing manager of the HANC. At power-on it operates verification diagnostics, boots the operational software and seeks to establish connection with the PSTN central office on the BRI D-Channel and with the PC. It communicates with the central office or a remote HANC via packets generated or examined on the D-channel. It makes the bandwidth assignments executed by the bandwidth control 34 and may exchange PC packets for transmission in or reception from a B-Channel. It understands call control sequences and directs the selectable CODECs 36 and POTS interfaces 38 to execute them. It monitors the state of the HANC 10 device and attempts to recover from device failure by performing reset and restart. It keeps a status record accessible by the PC.

The HANC 10 and specifically the base logic 42 supports two categories of function in communication with an attached PC on the Ethernet interface 40. It maintains a TCP socket by which PC software may exert control and obtain status. It also passes PC packets through to the bandwidth control 34 for inclusion in the B-channels, and vice-versa, when the PC is connected on the public network.

According to a particular implementation, the base logic 42 may be effected by a microprocessor operating under appropriate software, and the bandwidth control 34 may be a set of shift registers. Alternatively, a digital signal processor (DSP) might be used in which case it could integrate several other functional elements. Low cost integrated circuits are commercially available to support the CODEC 36 function and the POTS interface 38, but for supporting only five telephone ports much of that logic could be provided by the DSP. The Ethernet interface 40 is conventional functionality that may be implemented in separate hardware. However, with an aggregate signal bandwidth remaining of only 144 Kbps, or 6.9 microseconds per bit, or 116 DSP instructions per bit (60 nanoseconds each), and no algorithmic challenge worse than a PCM/ADPCM lookup table, a single DSP may perform all HANC logic above the physical layer.

Turning back to FIG. 1, in operation each HANC 10 may support at least two concurrently active calls, for instance, with two of its subordinate telephones 20 or one telephone 20 and the PC 16 connected externally, using the two B-channels on the BRI line 14 independently with each separately routed and connected. Alternately, if the only current user is the PC 16, both B-channels may be connected to the Internet Access Provider 26 thereby delivering maximum bandwidth of 128 Kbps. For a telephone connection, the HANC 10 may convert between analog voice and the PCM-encoded voice required on a B-channel, using 64 Kbps.

If the remote connection is another HANC 10, however, additional connectivity is available. In this case analog voice from the telephones 20 is converted to 24 Kbps ADPCM before application to a B-channel. When both B-channels are available between the two compatible HANCs 10, up to five telephones 20, each using a three-bit allocation as a voice subchannel, and the PC 16 using a one-bit allocation as a data subchannel, may converse concurrently with their counterparts on the 16 bits derived from the 8-bit octets of both B-channels combined.

Figure 3:
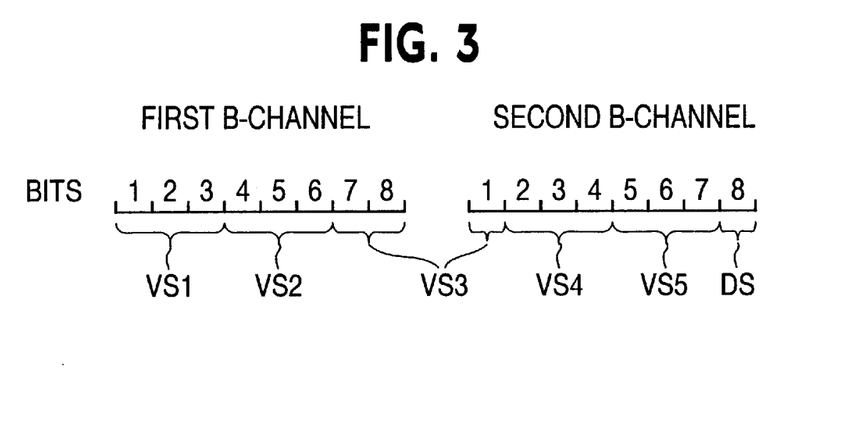
FIG. 3 illustrates an exemplary partitioning for the bandwidth of the ISDN bearer channels.

In FIG. 3, illustrated is an exemplary partitioning of the B-channel 8-bit octets to provide multiple communication subchannels whereby the up to five telephones and PC may communicate simultaneously over the ISDN line. In the 8-bit octets of the first B-channel, bandwidth defined by bits 1–3 may be allocated as a voice subchannel which is labeled VS1 and bits 4–6 as another voice subchannel VS2, in support of two separate telephone calls. For a third active telephone call, the voice subchannel VS3 bandwidth may occupy bits 7–8 of the first B-channel and bit 1 of the second B-channel. A fourth and fifth telephone call may be allocated voice subchannels VS4 and VS5 which occupy bits 2–4 and 5–7, respectively, of the second B-channel bandwidth of which the remaining bit 8 may be employed as a data subchannel DS for PC communications.

If only one B-channel is available for HANC-to-HANC communications, for example, because the other is busy with the remote telephone 24 shown in FIG. 1, two telephones 20 and the PCs 16 may converse concurrently between HANCs. In this case, the 8 bit frame of the one B-channel for HANC-to-HANC communications may be partitioned into two three bit voice subchannels and a two bit data channel. If the call is only between PCs 16, all available bandwidth is allocated to that connection, else three bits for each ADPCM voice subchannel. The HANC 10, or HANCs 10-A and 10-B in consultation, manage this bandwidth automatically in all cases.

The HANC 10 deallocates bandwidth when a call disconnects. It may also deallocate (i.e., deallocate and reallocate)

when a new call originates or arrives. In the case of two HANCs 10-A and 10-B originally connecting only their PCs 16, a subsequent call between subordinate telephones 20 requires deallocating three bits from the PC data subchannel to construct a new voice subchannel, but requiring consultation only between HANCs. The more drastic case is a new call between a subordinate and an independent remote telephone, namely telephone 24. An entire B-channel must be deallocated from the HANCs 10 in this case and diverted to serve the new call. This is accomplished by communication on the D-channel between HANCs as well as the PSTN 12 central office. In any case, if the necessary bandwidth is not available because too much is already allocated to relatively inflexible voice traffic, the new call is rejected on the D-channel or indicated busy to the subordinate telephone 20.

When a first connection is established between a HANC (e.g., the HANC 10-A) and a remote device through the PSTN 12, the HANC 10-A asks the remote if it is also a HANC using the X.25 protocol permitted end-to-end on the D-channel. If there is no valid response the HANC 10-A treats the new call as POTS-to-POTS, but if a HANC identification is received (e.g., from the HANC 10-B), subsequent signaling between the two HANCs, 10-A and 10-B, discloses the subsystem controlled by each as well as its current state. At the end of this exchange, requiring at most a few hundred milliseconds, each HANC 10-A and 10-B knows the devices connected to the other, their DNs, whether each is busy and how much bandwidth is available for allocation.

The following describes in more detail particular processes for subchannel bandwidth allocation and for external bandwidth extraction that may be adapted to the HANC system of FIG. 1.

Once the connection exists via a channel through the PSTN 12 between the two HANCs 10-A and 10-B, the effect of subchannel bandwidth allocation is to permit complex data flow between the individual PCs, referenced as 16-A and 16-B, simultaneously with multiple separate conversations between telephone sets 20 on the two HANCs 10, without calling upon the PSTN 12 for assistance. The HANCs 10-A and 10-B accomplish this by creating subchannels on the common network channel using time division multiplexing. Subchannels exist only as demanded by the traffic and function by appropriating a part of the full bandwidth as negotiated between the HANCs 10-A and 10-B. In the absence of demand for multiple subchannels most of the bandwidth is allocated to the single user. If that is a PC, its data are free to flow at the maximum rate.

Negotiation between HANCs 10 requires a subchannel reserved to such special communication. This is assigned that minimum of the channel bandwidth appropriate to timely negotiation and is called the control subchannel.

The process of allocating and removing subchannels is initiated by end user demand. An end user of one of the HANCs, such as the PC 16-A at HANC 10-A, first causes the initial connection through the PSTN 12 to another terminator, such as HANC 10-B. HANC 10-A inquires via the control subchannel whether that terminator is a compatible HANC. In the absence of a positive response it permits the PC 16-A to communicate by its default protocol, if one exists, or breaks the connection with suitable notification. If HANC 10-B responds, demonstrating compatibility, the two controllers proceed to open the full channel bandwidth, less that of the minimal control subchannel, to communication between the two PCs 16-A and 16-B. If the initial connection is requested by an analog telephone set 20, such as 20-A1, the HANC 10-A still elicits the compatibility indication. In its absence the "natural bandwidth" required of ordinary voice communication, 64 Kbps PCM, is allocated and no suballocation on that B-channel is possible for the remainder of the call. If telephone set 20-A1 called a compatible telephone, such as 20-B2, however, the HANCs 10-A and 10-B allocate the 24 Kbps of bandwidth as required by the ADPCM voice encoding, with the rest held in reserve for further demand.

Subchannel allocation employs the following steps, given the connection already established between PC 16-A and PC 16-B. As part of the initial compatibility exchange, each HANC 10-A and 10-B informed the other of the identifiers, i.e., telephone numbers, and types of all attached end-user devices.

1) User at telephone 20-B3 dials the DN of telephone 20-A2.
2) HANC 10-B notifies 10-A of this demand and proposes the extraction of a specified part of the current PC bandwidth to support the telephone conversation, using the control subchannel.
3) HANC 10-A investigates the state of telephone 20-A2, which may be idle, busy or non-working, and reports accordingly. If idle it instigates ringing at that telephone while HANC 10-B reflects a ringing tone to telephone 20-B3.
4) If no user answers telephone 20-A2, the user at telephone 20-B3 eventually abandons the call and HANC 10-B so notifies HANC 10-A.
5) If telephone 20-A2 answers, HANC 10-A ceases to ring and accedes to the suballocation request. Coincident with an accession message transmitted on the control subchannel, HANC 10-A extracts sufficient bandwidth from the PC subchannel to form the specified voice subchannel. After a specified period upon or after the close of the accession message, HANC 10-A effects the bandwidth changeover in its full channel transmission toward HANC 10-B.
6) HANC 10-B transmits an acknowledgment on the control subchannel. After a specified period upon or after the close of the acknowledgment message, HANC 10-B effects the bandwidth changeover in its transmissions toward HANC 10-A. Note that by measuring from the close of the accession and acknowledgment messages, synchronization of bandwidth changeover is obtained with bit-level timing accuracy. Also, the point in time when the bandwidth changeover is effected upon or after the close of the accession and acknowledgment messages may be predetermined, whether immediate or after a fixed time period.
7) Voice communication proceeds on the new subchannel, using the ADPCM encoding method, simultaneously with data transfer on the PC subchannel. Additional voice subchannels may also be opened by the same process. The only effect apparent upon interPC communications is a reduction in throughput, which may or may not be of concern.
8) The user at telephone 20-A2 hangs up.
9) HANC 10-A sends a deallocate message to HANC 10-B on the control subchannel, identifying the voice subchannel to be deallocated. After a specified period upon or after the close of the deallocation message, HANC 10-A restores that amount of bandwidth to the PC subchannel and effects the bandwidth changeover in its transmissions toward HANC 10-B.

10) HANC 10-B sends an acknowledgment message to HANC 10-A and likewise changes over to the larger PC subchannel bandwidth after the acknowledgment is complete.

Part of the bandwidth used between two HANCs 10 may be extracted to permit communications with outside devices, such as, the independent analog telephone 24. The process of extracting bandwidth is initiated by end user demand, either from outside the context of two connected HANCs 10-A and 10-B, or from a dependent user of a particular HANC 10 who wishes to communicate with an outsider.

Bandwidth extraction can be performed even when the HANCs 10 are used only by attached telephones 20. The process is best illustrated, however, by its operation when the principle communication is between PCs 16.

As part of the initial compatibility exchange, each HANC 10 informed the other of the identifiers, i.e., telephone numbers, and types of all attached end-user devices.

Outsider initiated extraction involves the following steps:

1) User at telephone 24 dials the DN of the telephone 20-A2 connected to HANC 10-A.
2) The PSTN 12 notifies the HANC 10-A of the incoming call, using processes equivalent to "Call Waiting" and "Caller-ID" as conventionally practiced.
3) HANC 10-A examines its outstanding bandwidth allocation. If bandwidth insufficient to support standard network voice remains unassigned or such bandwidth cannot be removed from PC support without disconnecting any conversation or exchange already in progress, it ignores or rejects the incoming call, according to the appropriate backbone network protocol.
4) If the necessary bandwidth can be found, however, HANC 10-A notifies HANC 10-B of the demand, using the control subchannel, and proposes the extraction of a sufficient part of the current PC bandwidth to support ordinary voice.
5) HANC 10-B accedes to the extraction request. Coincident with an accession message transmitted on the control subchannel, B extracts sufficient bandwidth from the PC subchannel to form the specified voice subchannel. After a specified period upon or after the close of the accession message, HANC 10-B effects the bandwidth changeover in its full channel transmission toward HANC 10-A.
6) HANC 10-A transmits an acknowledgment on the control subchannel. After a specified period upon or after the close of the acknowledgment message, HANC 10-A effects the bandwidth changeover in its transmissions toward HANC 10-B. Note that by measuring from the close of the accession and acknowledgment messages, synchronization of bandwidth changeover is obtained with bit-level timing accuracy.
7) HANC 10-A accepts the incoming call by notifying the PSTN 12 and creates an internal path for communication between telephones 20-A2 and 24.
8) Voice communication proceeds on the extracted channel, using the network standard encoding method, simultaneously with data transfer between HANCs 10 on the PC subchannel. Additional voice subchannels may also be opened between the HANCs 10, using a different process. The only effect apparent upon interPC communications is a reduction in throughput, which may or may not be of concern.

Insider initiated extraction involves the following steps:

1) The user at telephone 20-A2 dials a DN not administered by HANC 10-B, such as the number corresponding to telephone 24.
2) HANC 10-A examines its outstanding bandwidth allocation. If bandwidth insufficient to support standard network voice remains unassigned or such bandwidth cannot be removed from PC support without disconnecting any conversation or exchange already in progress, it informs the telephone 20-A2 user that local circuits are busy.
3) If sufficient bandwidth is found, however, HANC 10-A notifies HANC 10-B of the demand, using the control subchannel, and proposes the extraction of a sufficient part of the current PC bandwidth to support ordinary voice.
4) HANC 10-B accedes to the extraction request. Coincident with the accession message transmitted on the control subchannel, B extracts sufficient bandwidth from the PC subchannel to form the specified voice subchannel. After a specified period upon or after the close of the accession message, HANC 10-B effects the bandwidth changeover in its full channel transmission toward HANC 10-A.
5) HANC 10-A transmits an acknowledgment on the control subchannel. After a specified period upon or after the close of the acknowledgment message, HANC 10-A effects the bandwidth changeover in its transmissions toward HANC 10-B.
6) HANC 10-A notifies the PSTN 12 of its call to the DN of telephone 24 using an appropriate part of its full channel bandwidth and assigns that portion to network control, permitting the user at telephone 20-A2 to hear the network call progress reports.
7) If the telephone 24 answers, voice communication between telephones 20-A2 and 24 proceeds on the extracted channel, using the network standard encoding method, simultaneously with data transfer between HANCs 10 on the PC subchannel.
8) The user at telephone 20-A2 hangs up.
9) HANC 10-A notifies the PSTN 12 that the connection between telephones 20-A2 and 24 no longer exists.
10) HANC 10-A sends a restore bandwidth message to HANC 10-B on the control subchannel, identifying the voice subchannel to be restored for use by the PCs 16. After a specified period upon or after the close of the restore message, HANC 10-A restores that amount of bandwidth to the PC subchannel and effects the bandwidth changeover in its transmissions toward HANC 10-B.
11) HANC 10-B sends an acknowledgment message to HANC 10-A and likewise changes over to the larger PC subchannel bandwidth after the acknowledgment is complete.

In application of the above processes for subchannel bandwidth allocation and bandwidth extraction to the HANC system, the ISDN D-channel may be utilized for the control subchannel. If the initial connection through the PSTN 12 is established between PCs 16, the called HANC furnishes the DN of its second B-channel as part of the compatibility exchange and the calling HANC immediately calls through the PSTN 12 on the second B-channel, thus obtaining the maximum 128 Kbps for use in passing PC data. Subsequent demands by telephones 20 to share the bandwidth are negotiated on the D-channel as previously described.

Connections through the PSTN 12 are obtained using the ISDN standard Q.931 protocols on the D-channel. The calling HANC sends a compatibility inquiry via the end-user protocols on the D-channel, which are specified to agree with X.25 standards. If it receives the compatibility indicator as an X.25 response, the call proceeds as described above.

Notifications by the PSTN switch of incoming calls, such as the one described from telephone 24, arrive on the D-channel in the switch supported protocol. Subsequent negotiations between HANCs 10 use X.25 protocols. The extraction of bandwidth to support the voice demand proceeds as previously described. Here an entire 64 Kbps B-channel must be allocated to the external PCM voice flow. Only one such external connection can be supported simultaneously with the interHANC connection, which uses the other B-channel. That B-channel can still be subdivided, however, among PCs 16 and telephones 20 attached to the two HANCs 10-A and 10-B.

A further feature supported by the HANC 10 is a method for convenient call acceptance. To obtain the convenience of answering a telephone call in any part of a residence, a traditional method would place extension telephones in every part where such convenience is desired. This method bears the disadvantage that so long as an extension is busy, all the others are unavailable for separate use.

When the convenient call feature is active on the HANC 10, it rings all its idle telephones 20 simultaneously with a distinctive ringing pattern, preassigned according to DN, upon receipt of a call intended for any one of the DNs. That is, at the switch in the PSTN 12, the ISDN line 14 of the HANC 10 is represented by six DNs, one for the PC 16 and one for each analog telephone 20. Each DN is identified by its own pattern of long rings, short rings or variably spaced longs and shorts. The HANC 10 maintains the association between the DNs and corresponding distinctive ring patterns, and it selects the appropriate pattern for an incoming call according to the dialed DN received over the data channel from the switch.

The first idle telephone seen by the HANC 10 to go off-hook is then connected to the incoming call. The other idle telephones remain available for another call, either outgoing or incoming, in which case the same procedure is repeated. Furthermore, the same procedure of course may be applied to incoming calls from another HANC. Described above is a process for connecting the incoming call to the telephone gone off-hook.

This method for convenient call acceptance is applicable to telephone sets 20 wired to the HANC 10 either in the star configuration shown in FIG. 1 or by a local voice distribution method, described in the following.

The typical residential subscriber of telephone services uses a single telephone line for distribution of the service within his residence. Though several telephone sets may be attached to that line, they all operate interdependently as extensions and are represented by one DN at the public switch.

Figure 4:
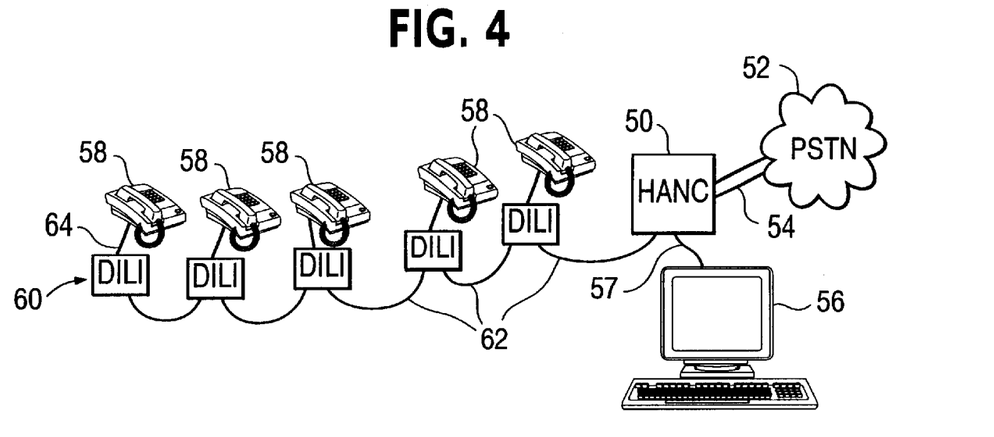
FIG. 4 is a schematic representing a second application having a HANC and distributed internal line interface (DILI) to provide single line voice distribution.

FIG. 4 illustrates a variation in the HANC system that supports the attachment of up to five POTS telephones by a single telephone line, yet permits each to converse independently of the others and to be represented by its own DN at a central office of the PSTN. A HANC 50 connects to the PSTN 52, via a national standard ISDN BRI line 54 consisting of two 64 Kbps B-channels and a 16 Kbps (control) D-channel, multiplexed together on the external line 54. It supports the attachment of a (i.e., one or more) PC 56 via 802.3 LAN 57. Up to five local analog telephones 58 may be attached via respective distributed internal line interfaces (DILIs) 60 devices to the HANC 50 over a dual twisted pair distribution line 62 located internal to a subscriber's residence. Additional device types may also be supported (not shown).

The HANC 50 interfaces with the public switch on the BRI D-channel and thus arranges connectibility through the PSTN 52. It is responsible for transferring encoded voice between the ISDN B-channels and the distribution line 62 to the DILIs 60 and for signaling the DILIs 60 to inform them of call progress. Each DILI 60 interfaces an analog POTS line 64 to the distribution line 62 from the HANC 30. It receives its operating power down that same line 62.

Figure 5:
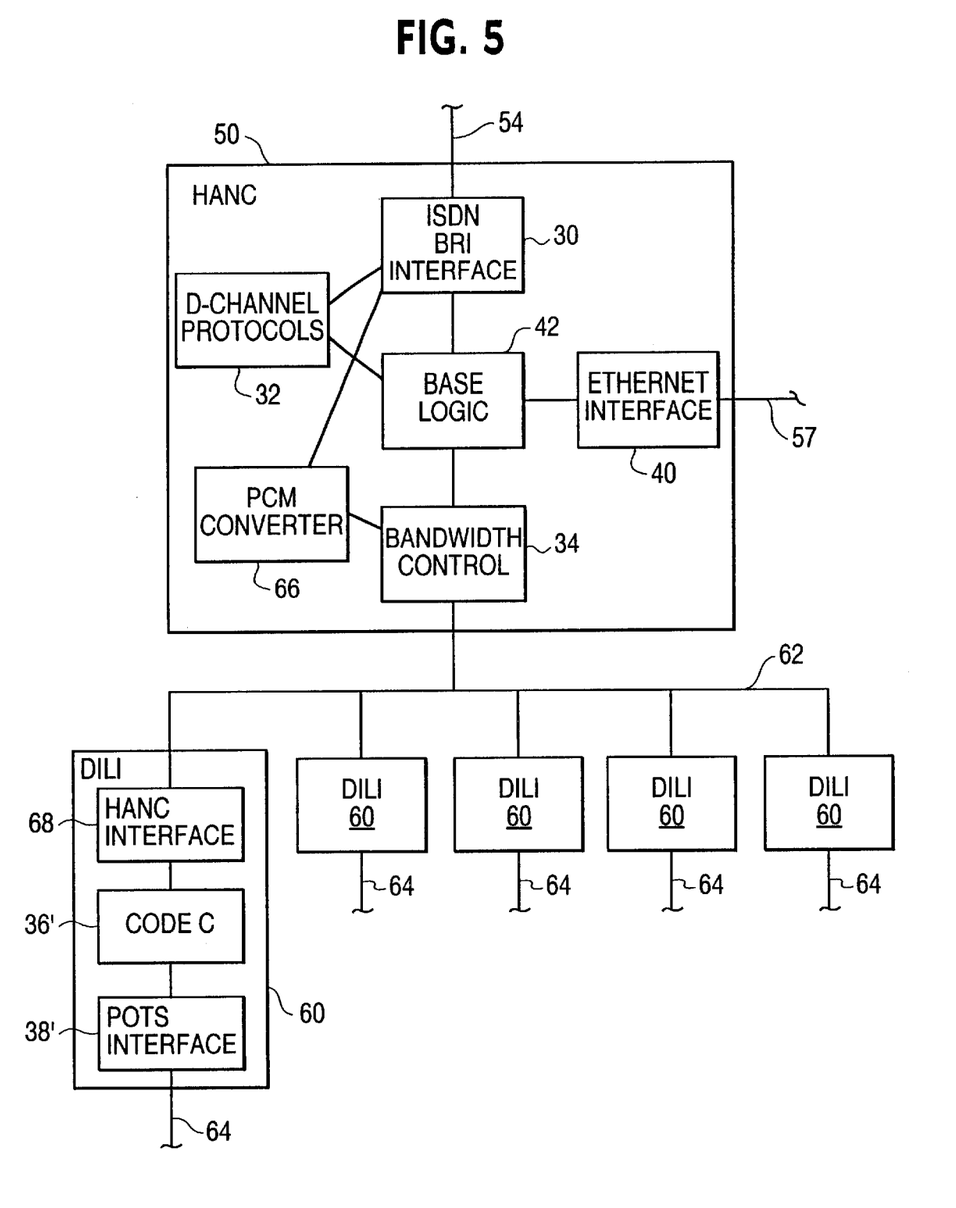
FIG. 5 is a block diagram depicting functional elements of the HANC and DILI.

Referring to FIG. 5, illustrated are the functional elements of the HANC 50 and the DILIs 60. The HANC 50 is similar to the HANC 10 embodiment in FIG. 2, except that the CODECs 36 and the POTS interfaces 38 are removed from the HANC 30 and now consigned to the DILIs 60, identified by references 36' and 38' respectively. In their place, the HANC 50 receives a PCM converter 66. The digitally encoded voice signals provided by the bandwidth control 34, either in PCM or ADPCM form, are made only PCM by the PCM converter 66 for transmission on the distribution line 62 to the DILIs 60.

In each DILI 60, the CODEC 36' converts analog voice to PCM voice and vice-versa passed between the POTS interface 38' and a HANC interface 68. The POTS interface 38' provides an analog line connector, line termination and impedance matching, pulse dial and DTMF detection, dial tone generator, busy tone generator, remote-ringing tone generator, and a ringing voltage generator. Functionality of the HANC interface 68 includes a distribution line connector, DC power separation and propagation on the distribution line 62, protocol support for call progress communication with the HANC 50, distribution physical protocol support for frame detection and channel (i.e. time slot) identification, a configurator to assign distribution channels, and a bi-directional frame redriver with drop-and-insert channel support. Each DILI 60 may be optionally equipped with caller identification (ID) display capabilities.

The distribution line 62 from the HANC 50 is a double twisted pair, typical residence wiring, one pair for each direction. All DILIs 60 are powered by DC on the combined pair. Signals are driven in a standard digital manner, such as Manchester or NRZI encoding, capable of AC coupling, at a bit rate relatively low but high enough to include five digital voice channels and five control channels in individual time frames. Each frame consists of five time slots corresponding to respective DILIs 60, wherein each time slot includes one of the voice channels and one of the control channels. The frame start is identified by recurrence of a fixed bit pattern. A control channel is used to inform the HANC 50 of the switch-hook status of a particular telephone 58 and a dialed telephone numbers or DTMF tones detected. In the reverse direction it conveys instructions to issue ringing voltage, to issue dial tone, busy tone or ringing tone and to display a delivered caller ID. In the inbound direction to the HANC 50, each DILI 60 uses a drop-and-insert technique, well known from T1 multiplexers, to insert its signals at the appropriate time slot.

Turning back to FIG. 4, the following illustrates the process to place a call from a DILI-connected telephone 58.

1) A user lifts receiver at a particular telephone 58.
2) The DILI 60 connected to that telephone 58 detects off-hook state and signals the HANC 50 on that DILI's control channel.
3) The HANC 50 responds with an instruction for the DILI 60 to issue dial tone.
4) The DILI 60, responsive to the received instruction, generates dial tone to the receiver of the attached telephone 58.
5) The user keys a called DN in DTMF tones.

6) The DILI 60 detects these tones, and transmits numeric codes to the HANC 50 on the control channel.

7) On receipt of the first numeric code, the HANC 50 instructs the DILI 60 to cease generation of the dial tone.

8) The HANC 50 requests connection to the called DN via its communications 54 with the central office of the PSTN 52. If the remote telephone (i.e., called DN) is busy, the HANC 50 instructs the DILI 60 to issue a busy tone. If the remote is being rung, the HANC 50 may either feed the remote ringing tones through to the DILI 60, if the switch provides any, or instruct the DILI 60 to generate its own.

9) The DILI voice channels, inbound and outbound, are activated through to the PSTN 52, with the DILI 60 performing basic analog to digital coding-decoding and the HANC 50 assuring compatibility with PSTN switch or remote HANC (if the called DN corresponds to such) requirements.

When a remote telephone calls the DN of a DILI-connected telephone, the following process is effected.

1) The central office switch of the PSTN 52 notifies the HANC 50 of the called DN.

2) The HANC 50 determines the particular DILI 60 that owns this DN.

3) If the DILI 60 and the dependent telephone 58 are busy, the HANC 50 so notifies the PSTN switch. Otherwise, via that DILI's control channel, the HANC 50 instructs the DILI 60 to generate ringing voltage and to display the caller ID.

4) A user lifts receiver at that telephone 58.

5) The DILI 60 informs the HANC 50 on the control channel that the telephone 58 is off-hook.

6) The HANC 50 instructs the DILI 60 to end ringing voltage and to activate its voice channels in both directions.

It is noted that the above processes are representative but not exhaustive.

If the local telephones 58 are connected to remote telephones not associated with a remote HANC (not shown), only two of the telephones 58 may be active simultaneously, one on each B-channel. If they are mediated by a remote HANC, however, in support of interfamily communications or small offices, up to five telephones 58 may be active concurrently, along with the PC 56. The method of interconnecting the up to five telephones through multiple HANCs was described above.

Those skilled in the art will recognize that various modifications and changes could be made to the invention without departing from the spirit and scope thereof. It should therefore be understood that the claims are not to be considered as being limited to the precise embodiment of the system set forth above, in the absence of specific limitations directed to each embodiment.

I claim:

1. In a system having a plurality of devices coupled to a first communications controller which is connected to an integrated services digital network (ISDN) line of a telecommunications network through which a call connection is established with a second communications controller, the ISDN line having two bearer channels of predetermined bandwidth and a data channel, a method of interfacing the devices to the ISDN line for concurrent communications over the call connection with the second controller, the method comprising:

negotiating, on the data channel, between the first and second communications controllers appropriation of one or more subchannels from the bandwidth of the two bearer channels; and allocating the one or more subchannels to respective devices of the plurality of devices, wherein the subchannels are allocated bits from one or more of the bearer channels so as to allow at least five devices to be allocated different call connections from the two bearer channels, and wherein each of the devices thereby connects through at least one of the two bearer channels to a different device.

2. A method as claimed in claim 1, wherein the step of negotiating the appropriation of a subchannel includes:

one controller of the first and second communication controllers sending a request for the subchannel to the other controller, wherein the request specifies bandwidth for the subchannel;

the other controller transmitting an accession message and, after a specific period upon close of the accession message, effecting the bandwidth changeover in the full channel transmission of the other controller towards the one controller; and the one controller transmitting an acknowledgement message and, after the specific period upon close of the acknowledgement message, effecting the bandwidth changeover in the full channel transmission of the one controller towards the other controller.

3. A method as claimed in claim 2, wherein the specific period is a predetermined time interval following the close of the accession message or the acknowledgement message.

4. A method as claimed in claim 3, wherein the specific period is immediately following the close of the accession message or the acknowledgement message.

5. A method as claimed in claim 1, wherein the plurality of devices include telephones; and each subchannel allocated to the individual telephones, as a voice subchannel, comprises 24 Kbps bandwidth for a digital voice signal.

6. A method as claimed in claim 5, wherein the digital voice signal is encoded in three bit adaptive differential pulse code modulation (ADPCM).

7. A method as claimed in claim 6, wherein the plurality of devices includes at least one data processing device and the subchannel allocated to the at least one data processing device, as a data subchannel, comprises available bandwidth of the two bearer channels not allocated to the telephones.

8. A method as claimed in claim 7, wherein the predetermined bandwidth of the two bearer channels is 128 Kbps, which supports a maximum of five 24 Kbps voice subchannels and a minimum of 8 Kbps for the data subchannel.

9. A method as claimed in claim 8, wherein the telephones are analog telephones and further comprising, for each analog telephone having been allocated a voice subchannel:

encoding an outgoing analog voice signal from the analog telephone into an outgoing ADPCM digital voice signal which is transmitted over the voice subchannel allocated thereto; and decoding an incoming ADPCM signal received from that voice subchannel into an incoming analog voice signal which is passed to the analog telephone.

10. A method as claimed in claim 1, further comprising sharing the predetermined bandwidth of the two bearer channels with a data device and allocating the data device at least one bit, such that the data device shares the predetermined bandwidth with up to five different call connections.

11. A method as claimed in claim 10, further comprising deallocating bandwidth that has been allocated to the data device and allocating it to a new call connection that is established.

12. A method as claimed in claim 10, further comprising allocating bandwidth from a terminated call connection to the data device to increase the bandwidth allocated to the data device.

13. A method as claimed in claim 1, wherein allocating the one or more subchannels to respective devices of the plurality of devices comprises allocating at least one bit from each of the two bearer channels to at least one of the respective devices, such that the at least one respective device is allocated bandwidth from both of the bearer channels.

14. A method as claimed in claim 1, wherein allocating the one or more subchannels to respective devices of the plurality of devices comprises allocating three bits, from one or more of the two bearer channels, to each of the respective devices.

15. A method as claimed in claim 1, further comprising communicating between the first communications controller and a line interface unit using a frame format which comprises a separate control channel and a separate data channel for each of the plurality of devices, wherein the line interface unit is disposed between the plurality of devices and the first communications controller.

16. An apparatus for interfacing a plurality of analog telephone terminals to an integrated services digital network (ISDN) line connected to a telecommunications network, the ISDN line having two bearer (B) channels and a data (D) channel, the apparatus comprising:

base logic;

an ISDN interface providing a physical bi-directional interface to the two B-channels and the D-channel of the ISDN line;

D-channel protocol means supporting communications with a central office of the telecommunications network and with a remote device, via the ISDN interface and D-channel over which command and response packets to and from the base logic with the central office or the remote device are transmitted;

a plurality of analog interfaces adapted to support respective telephone terminals for passing bi-directional analog voice signals;

a plurality of selectable coders/decoders (CODECs), connected to respective analog interfaces, for encoding the analog voice signals to digital pulse code modulation (PCM) or adaptive differential PCM (ADPCM) and decoding PCM or ADPCM to analog, as selected by the base logic; and bandwidth control adapted to connect, via the ISDN interface, the encoded voice signals to or from the selectable CODECs with communication subchannels allocated among bandwidth of the B-channels, as directed by the base logic, synchronized to the bit level between controllers, wherein the communication subchannels are allocated bits from one or more of the B-channels, so as to allow at least five analog telephone terminals to be allocated different call connections from the two B-channels, and wherein each of the analog telephone terminals thereby connects through at least one of the two B-channels to a different device.

17. An apparatus as claimed in claim 16, wherein the D-channel protocol means supports a Q.931 protocol by which the apparatus communicates with the central office.

18. An apparatus as claimed in claim 17, wherein the D-channel protocol means supports an X.25-based protocol by which the apparatus communicates with the remote device.

* * * * *